United States Patent [19]

Hahn

[11] Patent Number: 5,515,463
[45] Date of Patent: May 7, 1996

[54] MULTI-BRANCH MICROWAVE LINE FOR ELECTRO-OPTICAL DEVICES

[75] Inventor: Kenneth H. Hahn, Cupertino, Calif.

[73] Assignee: Hewlett-Packard Company, Palo Alto, Calif.

[21] Appl. No.: 402,255

[22] Filed: Mar. 10, 1995

[51] Int. Cl.[6] .................................................. G02B 6/26
[52] U.S. Cl. ............................ 385/40; 385/45; 385/14
[58] Field of Search ................................ 385/40, 23, 45, 385/31, 11, 14, 3

[56] References Cited

U.S. PATENT DOCUMENTS

| | | | |
|---|---|---|---|
| 4,709,978 | 12/1987 | Jackel | 385/45 |
| 4,843,350 | 6/1989 | Nazarathy et al. | 332/7.51 |
| 5,111,517 | 5/1992 | Riviere | 385/11 |
| 5,119,447 | 6/1992 | Trisno | 385/3 |
| 5,119,450 | 6/1992 | Ranganath et al. | 385/14 |
| 5,249,243 | 9/1993 | Skeie | 385/14 X |
| 5,267,336 | 11/1993 | Sriram et al. | 385/2 |
| 5,283,842 | 2/1994 | Hakogi et al. | 385/3 |
| 5,293,436 | 3/1994 | Diemeer | 385/11 |

*Primary Examiner*—John D. Lee
*Assistant Examiner*—Phan T. H. Palmer

[57] ABSTRACT

An electro-optical device for controlling an optical signal in response to an electrical signal includes a substrate having an optical path in which at least two waveguide arms diverge from an input portion. Typically, the waveguide arms include parallel regions and include convergence to an output portion. An electrical transmission line having a desired electrical impedance is positioned relative to the substrate for selectively changing the indices of refraction of the waveguide arms. The transmission line is a multi-branch design, with the branches in a one-to-one correspondence with the waveguide arms, so that each signal branch is aligned relative to a corresponding waveguide arm to couple an index-affecting electrical field to the corresponding waveguide arm. Preferably, the waveguide arms have opposite poling polarities, with each poling polarity being perpendicular to the direction of light propagation through the waveguide arms. Thus, a push-pull effect is achieved when identical electrical fields are generated by the branches of the single transmission line.

17 Claims, 2 Drawing Sheets

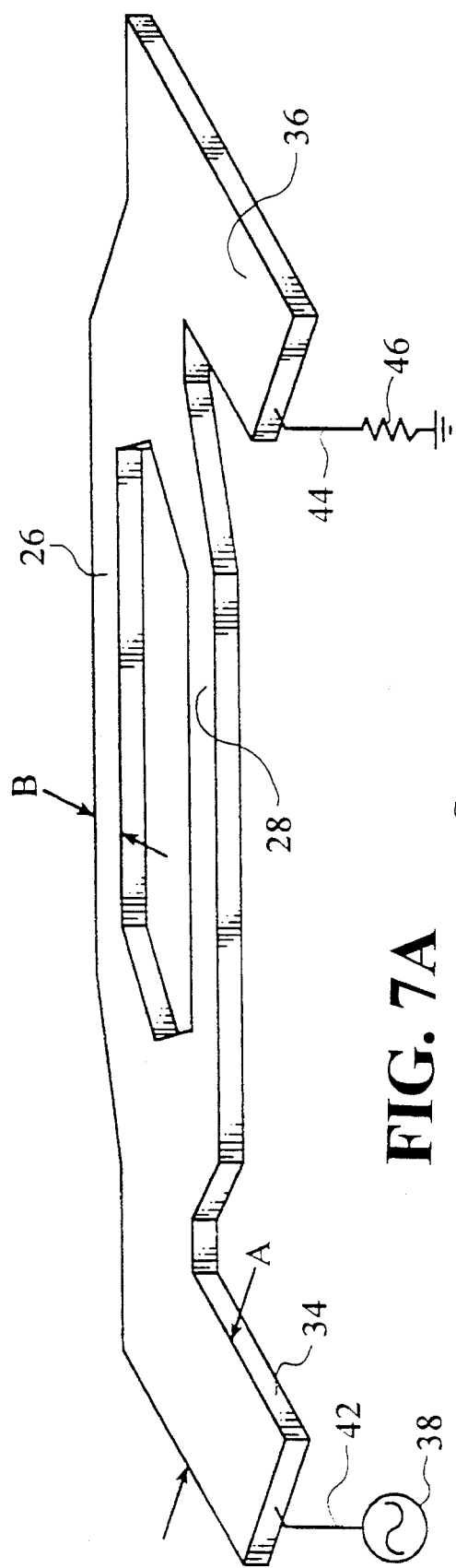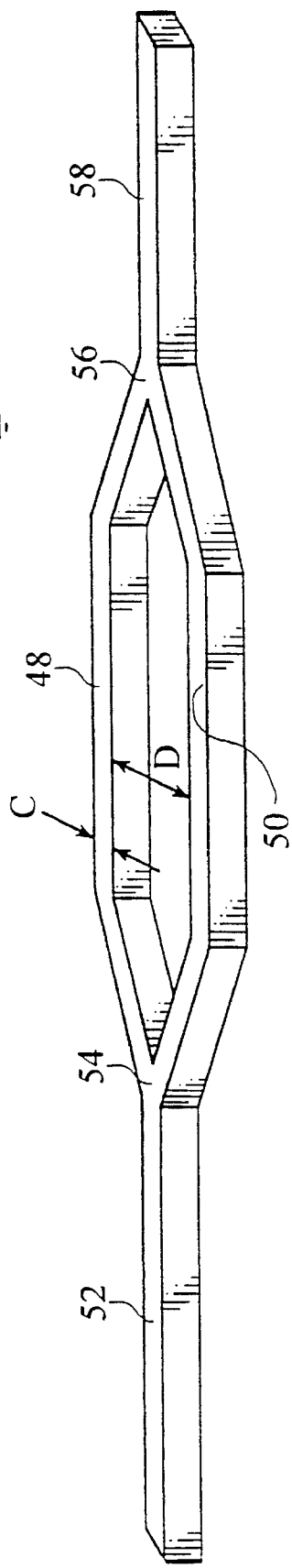
FIG. 7A
FIG. 7B

MULTI-BRANCH MICROWAVE LINE FOR ELECTRO-OPTICAL DEVICES

TECHNICAL FIELD

The present invention relates generally to electro-optical devices for controlling an optical signal in response to an electrical signal and relates more particularly to conduction of the electrical signal for intensity modulation of the optical signal.

BACKGROUND ART

Electro-optical devices may be used to control an input optical signal to achieve a desired output signal. For example, Mach-Zehnder intensity modulators are presently being utilized in the telecommunications industry. For electro-optical intensity modulators, an electric field influences the index of refraction of material that defines a waveguide, so that the intensity of an optical signal at the output of the waveguide is modulated in correspondence with changes in the electrical field.

Polymeric materials have the potential of exceeding the requirements for advanced intensity modulators, optical switches, and other nonlinear optical devices. The beneficial characteristics offered by polymeric materials include large optical non-linearities and low dielectric constants. The large optical non-linearities permit use of low operating voltages ($V_\pi$). Reductions in the dielectric constant permit simplification of high-speed modulation structures. Moreover, use of polymeric materials facilitates integration with electrical driving circuits and other optical devices, including semiconductor light sources and detectors.

Mach-Zehnder intensity modulators may be fabricated by forming three polymeric layers. Outside layers are cladding layers, while the center layer is used to form a waveguiding circuit. Photobleaching selected portions of the center layer of the substrate defines the waveguiding circuit. For example, the selected portions of the center layer may be exposed to light of the appropriate wavelength. The index of refraction is changed by the exposure. In this manner, an optical confinement is achieved along the waveguiding circuit. U.S. Pat. Nos. 5,119,450 to Ranganath et al. and 4,843,350 to Nazarathy et al., each of which is assigned to the assignee of the present invention, describe waveguiding circuits in which an input section is divided into a pair of parallel arms which converge to form an output section.

The photobleaching defines the optical path through the substrate, but the electro-optic effect is not achieved until the polymeric material is poled. In the poling process, nonlinear optical-active molecules are incorporated in the polymer matrix as guest/host, side-chain or cross-linked systems. The film is then poled by applying a high electric field across the substrate while it is heated to the glass-transition temperature of the material. The substrate is cooled to room temperature while the electrical field is maintained, thereby locking the molecules in the desired orientation.

After the poling process, the index of refraction along the waveguiding circuit can be varied in response to an applied electric field. Since the index of refraction of a material relates to the phase velocity of light in the material, an optical signal can be controlled by an electrical signal that defines the applied electrical field. Important goals in the design of an optical intensity modulator or switch include (1) reducing the modulation voltage required to achieve a desired electro-optic effect, (2) providing an impedance match between the source of the modulation signal and the electro-optical device, and (3) increasing the bandwidth of the device. As previously noted, the Ranganath et al. and the Nazarathy et al. patents describe waveguiding circuits that include intermediate portions having two arms. By poling the two arms to have opposite poling polarities, a push-pull effect can be obtained, allowing the switching voltage to be reduced by one-half. A single modulating signal is applied to the substrate to couple an index-affecting electrical field to both arms of the waveguiding circuit, but the reverse poling of the two arms induces opposite effects in the two arms with respect to indices of refraction.

Polymer Mach-Zehnder modulators with high bandwidth and low voltages have been achieved by using a microstrip transmission line to modulate the optical signal. Modulation bandwidth of 40 GHz has been reported, but not with the push-pull modulation approach that allows the fifty percent reduction in voltage. A lower power requirement is desirable, since it allows the equipment to use less costly drive circuitry. However, one difficulty in poling the two arms in opposite directions is that there is a tradeoff between fabrication concerns and operation concerns.

One fabrication concern involves dielectric breakdown during the poling process. Poling electrodes are positioned to induce separate and vectorially opposite electrical fields during the poling process. The two arms can easily be poled to have separate polarities when the two arms are spaced apart by a large distance. Referring to FIG. 1, a first poling electrode 10 and a second poling electrode 12 are shown on a side of a polymeric substrate 14. On the opposite side of the substrate is a ground electrode 16. DC voltages of opposite polarities are connected to the first and second electrodes, causing a first waveguide arm 18 to be poled in an opposite direction of a second waveguide arm 20 when the substrate is sufficiently increased in temperature. However, while the polymer of the substrate can withstand electrical fields of up to 2 MV/cm without breakdown occurring between the ground electrode 16 and one of the "hot" poling electrodes 10 and 12, breakdown between the two hot poling electrodes can easily occur if the separation between the two hot electrodes is on the order of the thickness of the substrate. This is because the potential between the two hot poling electrodes is approximately twice the potential between the ground electrode and one of the hot electrodes. In addition, the breakdown voltage of air is substantially less than that of the polymer. Thus, during the poling process, it is advantageous to have a large space between the first and second poling electrodes 10 and 12.

The poling electrodes 10 and 12 are then removed and may be replaced with a single transmission line having a microstrip geometry for applying a generally uniform electrical field across one or both of waveguide arms 18 and 20. In FIGS. 2 and 3, the single transmission line 22 is shown as extending over the two waveguide arms. Since the two arms are poled in opposite directions, a uniformly varying electric field generated by the transmission line 22 will result in push-pull modulation. The operation concern involves the electrical impedance. Conventionally, the thickness of a three-layer polymeric substrate 14 is between 8 and 16 µm. If the thickness is 10 µm and the width of the transmission line 22 is 50 µm, the characteristic impedance of the structure is 25 ohms, assuming that the microwave index of the polymer is approximately 4. The impedance of the transmission line is inversely related to the width of the transmission line.

Most high frequency components, cables and instruments have default impedances of 50 ohms. Therefore, the 25 ohm transmission line 22 of FIGS. 2 and 3 will be impedance mismatched to a source of a microwave modulation signal. Impedance mismatches cause power loss and reflections that adversely affect performance. The conventional solution is to form a narrower transmission line 23 over only one of the waveguide arms 20, as shown in FIG. 4, but this arrangement is less electro-optically efficient than the one of FIGS. 2 and 3.

Briefly, closely spaced waveguide arms 18 and 20 are desirable during operation, since the uniform electrical field can be applied to the two arms by a narrow transmission line 22. Because linewidth and electrical impedance are inversely related, impedance matching with the signal source is more easily achieved if the linewidth is narrow. However, fabrication concerns dictate widely spaced waveguide arms, since dielectric breakdown is less likely to occur during a process of poling the two arms in opposite directions with large fields. Optical modulators having a 40 GHz bandwidth have been demonstrated using a thin 50 ohm microstrip transmission line to couple an electric field with a single arm, but the absence of the push-pull effect necessitates higher modulating voltages. One possible solution is to pole the two arms of a Mach-Zehnder device by applying the poling voltages in alternating pulses, thereby reducing the susceptibility of the poling process to dielectric breakdown. However, this technique is difficult to implement. Moreover, an operation consideration that has not been previously identified is optical crosstalk. Light energy from one waveguide arm may escape and enter the other waveguide arm. Thus, there is a second factor that leads away from closely spacing the waveguide arms.

What is needed is a low voltage, high bandwidth electro-optical device that decreases susceptibility to dielectric breakdown during the poling process and that reduces optical crosstalk during operation, while permitting flexibility in the structure of a transmission line with regard to achieving a desired electrical impedance of the transmission line.

SUMMARY OF THE INVENTION

An electro-optical device for controlling an optical signal in response to an electrical signal has been designed to provide a one-to-one correspondence of transmission line signal branches to waveguide arms of an optical waveguide through a substrate. In the preferred embodiment, there are two waveguide arms that diverge from an input portion of an optical waveguide through a polymeric substrate and then converge at an output portion. The transmission line has single-line input and output sections, but has an intermediate section in which each signal branch is dedicated to a single waveguide arm for coupling an index-affecting electrical field to the waveguide arm. Still referring to the preferred embodiment, the signal branches couple generally identical electrical fields to the waveguide arms.

The substrate is preferably a polymeric substrate that may be a multi-layer structure. The optical waveguide is formed by photobleaching selected regions of the substrate to define the input and output portions and the waveguide arms. A two-arm waveguide includes a first arm that has a poling polarity opposite to the second arm. Consequently, when the two branches of the transmission line generate the electrical fields, a push-pull effect is achieved. This effect permits use of a low-voltage modulating signal along the transmission line.

The signal branches of the transmission line have major regions that extend in parallel relationship with each other and with the waveguide arms of the optical path through the substrate. The optical path may be fully embedded into a multi-layer substrate, or may be at the surface of a single-layer substrate. The design of the optical path through the substrate is not critical to use of the invention. Rather, the invention increases the flexibility of the design of the optical path, since the waveguide arms may be moved further apart than typical for a push-pull Mach-Zehnder intensity modulator.

An advantage of the invention is that the desired electrical impedance of the electrical transmission scheme may be achieved, while the signal branches are designed to accommodate fabrication and operation considerations for the waveguide arms. Thus, the signal branches need not impose limitations on the optical path through the substrate. Ideally, a 50 ohm transmission line impedance is established, but significant improvements are realized whenever the electrical impedance of the transmission line is substantially matched to the electrical impedance of the signal source. "Substantially matched" is defined herein as being a difference of no greater than ten ohms.

Since the invention allows the selection of an optical path through the substrate to be more independent of design considerations of the transmission line, the waveguide arms can be moved further apart than the arms of prior art high frequency, low voltage electro-optical devices. As a result, a second advantage of the invention is that the fabrication technique is less susceptible to dielectric breakdown during the poling process. High intensity electric fields may be utilized to pole the first and second waveguide arms in opposite directions, since the greater space between the waveguide arms acts against breakdown between the two oppositely charged poling electrodes. Additionally, the greater distance between the first and second waveguide arms reduces optical crosstalk between the two arms.

BRIEF DESCRIPTION OF THE DRAWINGS

FIG. 7 is a perspective view of the structure for defining the electrical and optical paths of the device of FIG. 6.

BEST MODE FOR CARRYING OUT THE INVENTION

Figure 5:
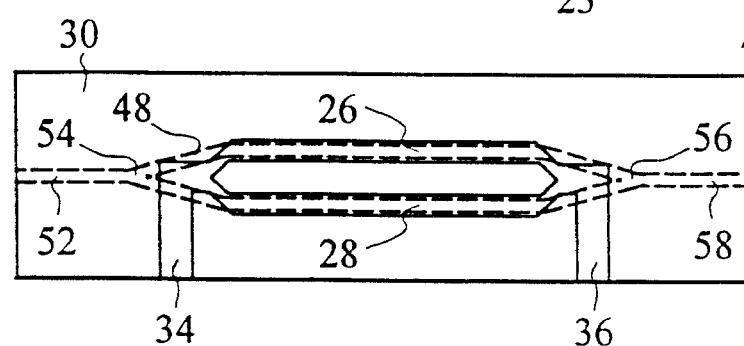
FIG. 5 is a top view of a multi-branch transmission line for controlling an optical signal in response to an electrical signal in accordance with the invention.
Figure 6:
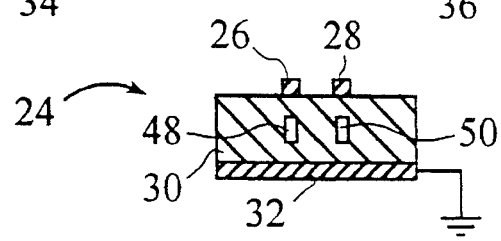
FIG. 6 is a sectional view of the device of FIG. 5.

With reference to FIGS. 5, 6 and 7, an electro-optical device 24 is shown as having a two-branch microstrip transmission line in which a first branch 26 is parallel to a second branch 28. The first and second signal branches are formed on a side of a substrate 30 opposite to a ground plane 32. The signal branches are an intermediate section of a Mach-Zehnder-like transmission line structure. That is, the two branches diverge from an input line 34 and converge at an output line 36.

The transmission line that consists of the input and output lines 34 and 36 and the first and second branches 26 and 28 may be fabricated by known photolithographic and electroplating techniques. An acceptable material is gold having a thickness in the range of 1.5 μm to 2.5 μm. The ground plane 32 may also be formed of gold. An acceptable thickness for the ground plane is 2.5 μm. However, none of these dimensions is critical to the invention.

The width at the input and output lines 34 and 36 is shown as dimension A in FIG. 7. The width should be selected to establish an electrical impedance that matches the electrical impedance of a source 38 of a modulating signal. In the preferred embodiment, the source provides a microwave signal. Typically, an input connection 42 and an output connection 44 to the two-branch transmission structure have impedances of 50 ohms. If each of the input and output lines 34 and 36 is formed of gold at a thickness of 2 μm, and the substrate 30 is formed of a polymeric material having a microwave index of approximately 4 and a thickness of approximately 12 μm, the width A may be 26 μm in order to establish an electrical impedance of approximately 50 ohms. If the impedance of a microwave source 38 is 50 ohms and a terminating resistor 46 has a 50 ohm impedance, then width A should be selected to provide an impedance within the range of 40 ohms and 60 ohms.

Upon input of a microwave signal from the source 38, each of the first and second signal branches 26 and 28 generates an electrical field. In the preferred embodiment, the polymeric substrate 30 includes a first waveguide arm 48 that is aligned with the first branch 26 and includes a second waveguide arm 50 that is aligned with the second branch 28. The waveguide arms are integral with the remainder of the substrate 30, but have undergone processing that affects the index of refraction of the substrate material in order to define an optical path through the substrate. An acceptable substrate material is a polymeric material, but other materials may be substituted. In forming the substrate 30 of FIG. 6, a first cladding layer may be formed on a silicon substrate having a gold layer that will provide the ground plane 32. The first cladding layer is then covered with a waveguide layer. It is this waveguide layer that is processed in order to define the optical path. For example, a high intensity collimated light having the appropriate characteristics may be used to expose portions of the waveguide layer through a mask. Exposed portions of the layer undergo a photochemical change that redefines the index of refraction. A top cladding layer is then formed on the waveguide layer to complete the fabrication of the substrate.

The push-pull modulation effect is achieved by using the techniques described with reference to FIG. 1. Poling electrodes induce oppositely directed electric fields at the left and right sides of the substrate 30 of FIGS. 5 and 6. As a result, the poling polarity on the side of the substrate associated with the first waveguide arm 48 is opposite to the poling polarity of the substrate at the side of the substrate associated with the second waveguide arm 50.

Figure 1:
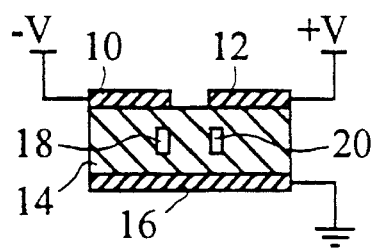
FIG. 1 is a sectional view of the poling of a substrate for forming an electro-optical device in accordance with the prior art.
Figure 3:
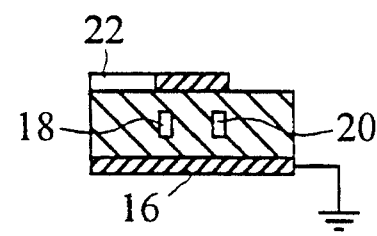
FIG. 3 is a sectional view of the prior art device of FIG. 2.

The problems associated with push-pull poling of the substrate 14 of FIG. 1 are less of a concern in the push-pull poling of the substrate 30 of FIG. 6, since the two-branch 26 and 28 microwave transmission line permits a greater separation between the two waveguide arms 48 and 50. Referring to FIG. 7, the distance D between the waveguide arms 48 and 50 may be 100 μm. This larger separation permits the poling electrodes, not shown, to be sufficiently spaced apart to minimize the risk of dielectric breakdown between the poling electrodes. Moreover, electrical crosstalk between the two regions to be oppositely poled is less likely to occur.

During operation, the relatively large distance (D) between the first and second waveguide arms 48 and 50 reduces optical crosstalk between the two arms. Light is introduced at the end of an input portion 52 of the optical path through the substrate 30. The light energy is divided at a first Y-junction 54, which causes the waveguide arms to diverge. After extending in parallel relationship with each other for a region in which the microwave signal is to have its maximum effect for push-pull modulation, the waveguide arms converge to a second Y-junction 56 at the end of an output portion 58 of the optical path.

An acceptable width (C) for the waveguide arms 48 and 50 is 4 μm, if the width (B) of the branches 26 and 28 are 5 μm. However, these dimensions are not critical to the invention.

In operation, the electro-optical device may be used as a Mach-Zehnder modulator to convert a phase modulation produced in the waveguide arms 26 and 28 into intensity modulation at the output portion 58 of the optical path. An electrical signal from the microwave source 38 is conducted in parallel along the two signal branches 26 and 28. Since the substrate 30 is poled to have opposite polarities that are perpendicular to the direction of the propagation of light through the waveguide arms 48 and 50, the effect of the electrical field upon the index of refraction of a waveguide arm will be significantly different for the two arms. The phase velocity of each of the two waveguide arms is generally equal to the speed of light divided by the index of refraction of the arm. Since the indices of refraction of the two waveguide arms vary in an opposite manner, a low voltage signal may be applied to the transmission line to obtain acceptable results.

Figure 2:
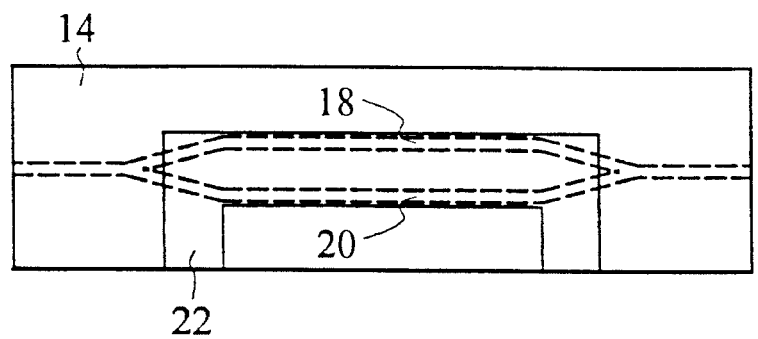
FIG. 2 is a top view of a prior art electro-optical device in which a single transmission line provides a push-pull modulation.
Figure 4:
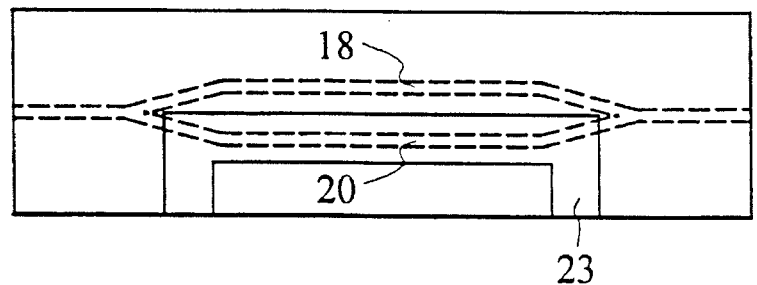
FIG. 4 is a top view of a second embodiment of a prior art electro-optical device having a single-branch transmission line.

In experimentation, the performance of a single-arm microstrip transmission line, as shown in FIG. 2, was compared to the performance of the transmission line scheme of FIG. 5. The prior art single-branch microstrip transmission line 22 had a width of 28 μm in order to obtain an electrical impedance of approximately 50 ohms. The width of each branch 26 and 28 of the transmission line of FIG. 5 was 8 μm, and the branches were separated by a distance of 200 μm. The lengths of the transmission lines of FIGS. 2 and 5 were both 2 cm. The gold transmission lines were each fabricated by standard photolithographic and electroplating techniques to have a thickness in the range of 1.5 to 2.5 μm. The thickness of each substrate 14 and 30 was 15 μm, and the thickness of the gold ground plane on the bottom side of the substrate was 2.5 μm. With a dielectric constant of 4 for the polymeric substrate, the calculated microwave impedance was 47 ohms for the two-branch transmission line of FIG. 5 and 54 ohms for the single-branch transmission line of FIG. 2.

The impedance of approximately 50 ohms for the two-branch 26 and 28 structure of FIG. 5 was maintained by designing each branch to be a standard microstrip transmission line having an electrical impedance of approximately 100 ohms, if each branch were to be viewed in isolation. Because the transmission line structure was symmetrical and the two branches were electrically parallel, the transmission scheme had an overall impedance of approximately 50 ohms.

The microwave transmission and reflection properties of the two structures were evaluated using an HP 8510B network analyzer and using an HP 8516A 40 GHz test set. With regard to the measurement of the complex transmission coefficient as a function of frequency, the performances of the two electro-optical devices were similar with the range of 0 and 40 GHz. The reflection coefficient was also measured and peak reflections of −10 to −15 dB were observed for both structures, indicating that there was a good impedance match of the transmission lines to the 50 ohm impedance of the test set.

The results of the experimentation showed that the microwave properties of the two-branch transmission structure of FIG. 5 are comparable to those of prior art microwave electro-optical devices. Thus, large separations between the two branches are possible with careful design. As a result, high speed electro-optical polymer modulators may be fabricated using push-pull poling of two waveguide arms with a low susceptibility to dielectric breakdown across the poling electrodes. Moreover, electrical crosstalk and optical crosstalk are less likely to occur.

While the invention has been described and illustrated as having two branches of a microstrip structure, two-branch coplanar transmission lines are also possible.

I claim:

1. An electro-optical device for controlling an optical signal in response to an electrical signal introduced from a source having a first electrical impedance comprising:

a substrate having an optical waveguide defined in said substrate, said optical waveguide having an input portion and a plurality of waveguide arms diverging from said input portion, each waveguide arm having a variable index of refraction; and electrical signal transmission means positioned relative to said substrate for selectively changing said indices of refraction of said waveguide arms, said transmission means having an input line and having a plurality of signal branches extending from said input line, said transmission means having an electrical impedance substantially matched to said first electrical impedance, said waveguide arms and said signal branches having a one-to-one correspondence in which each signal branch is aligned relative to a corresponding waveguide arm to couple an index-affecting electrical field to said corresponding waveguide arm.

2. The device of claim 1 wherein said transmission means is an electrode circuit in which said signal branches are integral with said input line, each signal branch being formed on said substrate in alignment with said corresponding waveguide arm.

3. The device of claim 2 wherein each signal branch has a linear region that extends parallel to a linear region of said corresponding waveguide arm.

4. The device of claim 1 wherein said optical waveguide has an output portion, said waveguide arms converging at said output portion such that said waveguide arms define an intermediate portion of said optical waveguide.

5. The device of claim 1 wherein said optical waveguide has two waveguide arms and said transmission means has two signal branches, said transmission means having an output line connected to said signal branches at ends opposite to said input line.

6. The device of claim 1 wherein said transmission means has an output line that is integral with said signal branches, said transmission means having an electrical impedance in the range of between 40 ohms and 60 ohms.

7. The device of claim 1 wherein said substrate is formed of at least one polymeric material and said optical waveguide is formed in said polymeric material.

8. The device of claim 1 wherein said waveguide arms are first and second waveguide arms through said substrate, said first waveguide arm having a poled polarity opposite to a poled polarity of said second waveguide arm.

9. An electro-optical device for controlling an optical signal in response to an electrical signal comprising:

a substrate having an optical path therethrough, said optical path having an input section and an output section and having an intermediate section between said input and output sections, said intermediate section having first and second arms that diverge at an end of said input section and that converge at an end of said output section, said first and second arms having substantially opposite poling polarities;

an electrical path along said substrate, said electrical path having input and output signal lines, said electrical path having first and second branches between said input and output signal lines for conducting a signal in electrical parallel relationship from said input line to said output line, said first branch being aligned with said first arm to apply an electric field to said first arm, said second branch being aligned with said second arm to apply an electric field to said second arm, said electrical path having a first microwave impedance; and source means connected to said input signal line for applying a microwave signal to said first and second branches, said source means having a microwave impedance substantially matched to said first microwave impedance.

10. The device of claim 9 wherein said input and output signal lines and said first and second branches have geometries to establish said first microwave impedance within the range of 40 ohms to 60 ohms.

11. The device of claim 10 wherein said source means is connected to said electrical path by a component having an electrical impedance within said range.

12. The device of claim 9 further comprising a ground plane on a side of said substrate opposite to said electrical path.

13. A method of forming an electro-optical device comprising steps of:

forming a substrate having at least one polymeric layer and an optical path within said polymeric layer, including defining said optical path to have input and output sections and an intermediate section between said input and output sections, said defining said optical path including changing the index of refraction of said polymeric layer at selected regions of said polymeric layer and further including forming said intermediate section to have first and second arms that diverge at an end of said input section and converge at an end of said output section;

establishing a nonlinear electro-optic effect at each of said first and second arms, including poling said polymeric layer such that opposite poling polarities are formed at said first and second arms;

forming an electrical path along said substrate such that an input line having a first electrical impedance is connected to first and second branches, including aligning said first and second branches to couple substantially identical electrical fields respectively to said first and second arms; and connecting a microwave signal to said electrical path to induce said substantially identical electrical fields.

14. The method of claim 13 wherein said step of forming said electrical path includes forming an output line connected to ends of said first and second branches opposite to said input line such that said electrical path has an electrical impedance within the range of 40 ohms to 60 ohms.

15. The method of claim 13 wherein said step of forming said substrate includes forming said first and second arms to be in a parallel relationship.

16. The method of claim 15 wherein said step of forming said electrical path includes forming said first and second branches to be in a parallel relationship with said first and second arms.

17. The method of claim 13 further comprising forming a ground plane on said substrate such that said ground plane is at an opposite side of said polymeric layer from said electrical path.

* * * * *